United States Patent [19]

Riccardi

[11] 4,137,652

[45] Feb. 6, 1979

[54] APPARATUS FOR VERIFICATION OF THE PYTHAGOREAN THEOREM

[76] Inventor: Rocco Riccardi, Via Gorizia, 7, Bari, Italy

[21] Appl. No.: 848,842

[22] Filed: Nov. 7, 1977

[30] Foreign Application Priority Data

Nov. 9, 1976 [IT] Italy ................................. 2122 A/76

[51] Int. Cl.$^2$ ............................................. G09B 23/02
[52] U.S. Cl. ........................................................ 35/34
[58] Field of Search ............................................ 35/34

[56] References Cited

U.S. PATENT DOCUMENTS

| | | | |
|---|---|---|---|
| 1,469,954 | 10/1923 | Kennedy | 35/34 |
| 1,521,247 | 6/1925 | Brown | 35/34 |
| 1,642,236 | 9/1927 | Foster | 35/34 X |
| 2,507,460 | 5/1950 | Schacht | 35/34 |
| 2,885,795 | 5/1959 | Feldhake | 35/34 |
| 3,359,653 | 12/1967 | Redfern | 35/34 |

FOREIGN PATENT DOCUMENTS 165578  7/1921  United Kingdom ........................ 35/34

OTHER PUBLICATIONS

Welch Physics and Chemistry Digest, vol. 5, No. 2, p. 27, 1955.

Primary Examiner—William H. Grieb
Attorney, Agent, or Firm—Allison C. Collard; Thomas M. Galgano

[57] ABSTRACT

A didactical aid for the teaching of geometry and, more particularly, an apparatus is provided which allows the experimental verification of the Pythagorean theorem on an infinite number of right triangles obtained by varying the acute angles formed by the hypotenuse with the perpendiculars. The apparatus is operated by means of a knob and immediately visualizes the Pythagorean relation.

8 Claims, 10 Drawing Figures

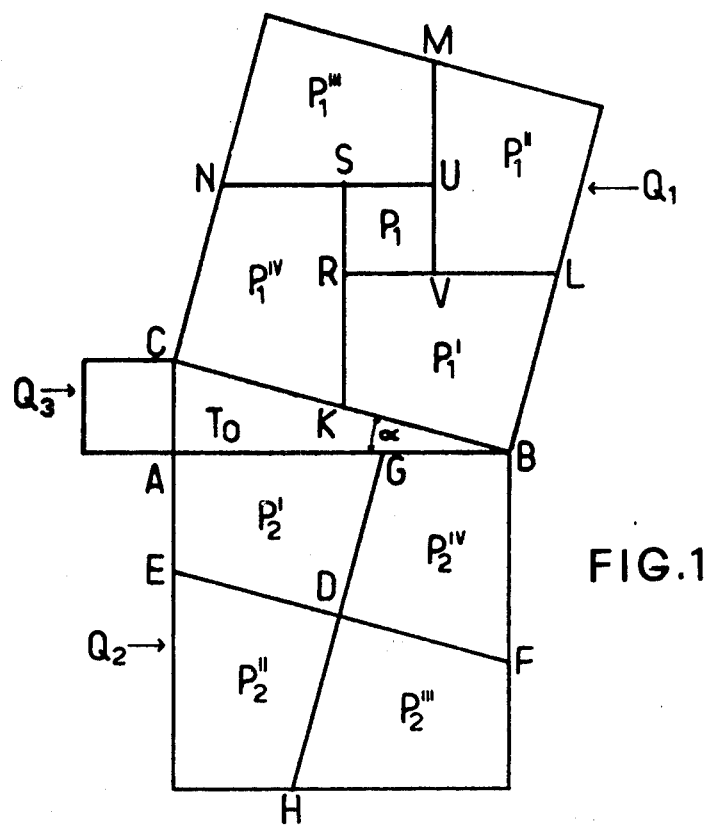
FIG. 1
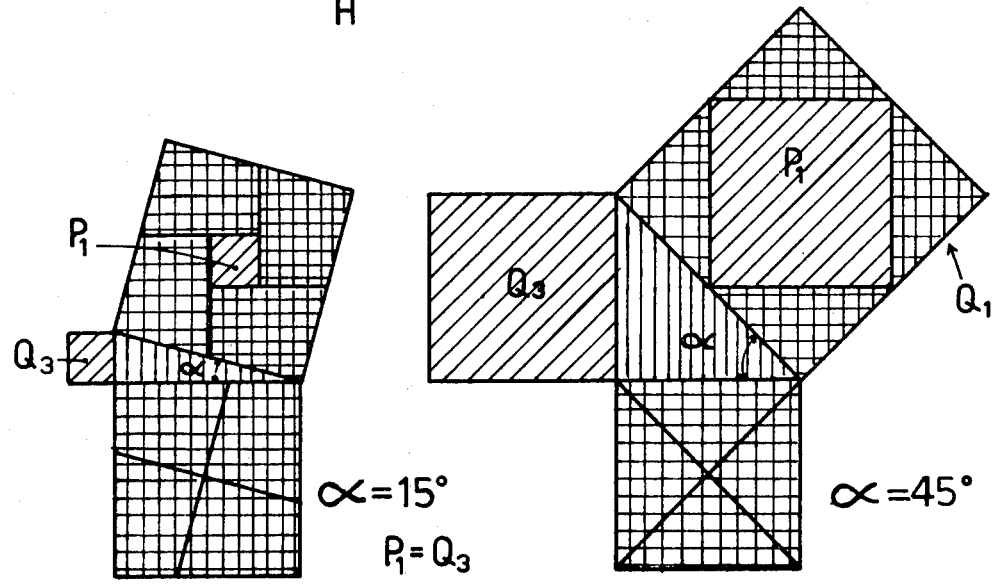
FIG. 2
FIG. 3

APPARATUS FOR VERIFICATION OF THE PYTHAGOREAN THEOREM

The present invention relates to a didactical aid for the teaching of geometry and, more particularly, it pertains to an apparatus which allows the experimental verification of the Pythagorean theorem on an infinite number of right triangles, which are obtained by varying the acute angles formed by the hypotenuse and the perpendicular sides of a right triangle.

As is well known, the means presently used for the experimental verification of this theorem require a complex preliminary preparation and they do not allow one to perform an extensive verification on an infinite number of right angles that are different from each other.

Accordingly, the main object of the present invention is to supply a didactical apparatus for the experimental verification of the Pythagorean theorem, not just for one case, but comprehensively and continually for a whole series of cases differing among themselves by the diversity of the acute angles, or by the various length ratios between the sides of the right triangles.

Another important object of the present invention is to supply a didactical apparatus which, besides being suited to verify the Pythagorean problem, is also suited for its rational analytical demonstration.

The invention accomplishes these and other related objects by the provision of a novel mechanical arrangement of which the parts can be reciprocally moved among themselves, by operating a single knob or any other such device.

Thus, an apparatus is provided for the comprehensive verification of the Pythagorean theorem which performs the Perigal verification of the Pythagorean theorem by subdividing into five polygons the square built on the hypotenuse, with one of the polygons being a central square having an axis coaxial with the axis of the square built on the hypotenuse, and into four polygons the square built on the longer perpendicular side, of a right triangle.

The apparatus includes a generally horizontally-disposed, fixed frame and a vertically-slidable, generally vertically-disposed movable frame supported on the fixed frame. The movable frame has a vertically-disposed, toothed rack mounted thereon and a sleeve supported by a pin for rotation about an axis normal to the movable and fixed frames. A toothed wheel, in mesh with the teeth of the rack, is operable by a knob to effect vertical movement of the movable frame.

The device also includes a leg representing the hypotenuse of a right triangle, which has one end non-slidably- and rotatably-supported on the fixed frame and its other end being slidably received in the sleeve. The portion of the movable frame disposed between the sleeve and the fixed frame defines one perpendicular side of the right triangle, and the portion of the fixed frame between the one end of the leg and the movable frame defines the other perpendicular side of the right triangle. A system of three legs, disposed in a U-shaped arrangement with adjacent legs at right angles to one another, is coupled to the leg representing the hypotenuse to define a square built on the hypotenuse, one of the legs represents the upper side of the square and the other two legs represent the left and right lateral sides of the square, respectively, with the leg representing the hypotenuse serving as the lower side of the square. At least one of the legs of the system is reciprocably movable relative to the other legs, so as to vary the dimensions of the square when changing the effective length of the leg representing the hypotenuse, effected by movement of the movable frame which changes the included angle between the leg representing the hypotenuse and the fixed frame. Lever means are provided for moving the at least one leg of the system, which means are responsive to movement of the leg representing the hypotenuse.

A vertically-disposed leg is provided which represents the west side of a square built on the shorter perpendicular side of the right triangle, which is supported for sliding movement on the fixed frame. Lever means are provided for moving the leg representing the west side toward and away from the movable frame in response to movement of the movable frame relative to the fixed frame. The device also includes a horizontally-disposed leg, representing a north side of a square built on the shorter perpendicular side of the right triangle, which is mounted on the movable frame for movement therewith; the other two east and south sides of the square built on the shorter perpendicular side of the right triangle are defined by the rectilinear edge portions of the movable and fixed frames, respectively.

A cross including two intersecting legs disposed at right angles to one another, is rotatable about an axis at the center of the square built on the longer perpendicular side of the right triangle. Lever means are provided for positioning the cross at the center of the square built on the longer perpendicular side and for rotating the cross in direct response to rotation of the leg representing the hypotenuse, so that one of the legs of the cross is kept perpendicular, and the other leg of the cross is kept parallel, relative to the leg representing the hypotenuse.

A vertically-disposed leg representing a straight line segment passing through the mean point of the upper side of the square built on the hypotenuse, is slidably supported on the fixed frame and is moved by lever means. A horizontally-disposed leg representing a straight line segment passing through the mean point of the left side of the square built on the hypotenuse, is rigidly mounted on the movable frame. A plurality of polygonal panels in differing colors relative to each of the geometrical figures obtained through the subdivision of the squares built on the sides of the right triangle, are each coupled to and movable with one of the legs of the device.

A first board is disposed parallel to, and behind of, the movable and fixed frames, and is subdivided into various colored sectors which, in cooperation with the colored panels, define identical geometrical figures by the same color. A second board is disposed parallel to, and in front of the movable and fixed frames, and includes a plurality of window openings, exactly delimiting in dimensions and position the squares built upon the sides of a right triangle, having a maximum included angle of 45° formed by the leg representing the hypotenuse and the fixed frame portions representing the longer perpendicular side of the right triangle. The window opening positioned and dimensioned relative to the square built on the longer perpendicular side is at least partly occluded by a square panel of the same dimensions spaced behind and parallel to the second board, a sufficient distance to permit the legs of the cross to pass therebetween. The board also has a right triangular sector formed thereon which is positioned and dimensioned to correspond to the dimensions of a right triangle, having a minimum included angle of less than 45°. Finally, the apparatus also includes a third board, disposed parallel to and in back of the first board, which serves as a cover; the three boards are spaced from one another in superimposed relation.

Other objects and features of the present invention will become apparent from the following detailed description when taken in connection with the accompanying drawings, which disclose a single embodiment of the invention. It is to be understood that the drawings are designed for the purposes of illustration only, and are not intended as a definition of the limits and scope of the invention disclosed.

In the drawings, wherein similar reference numerals denote similar elements throughout the several views;

FIG. 1 is a geometric diagram graphically illustrating the Perigal verification of the Pythagorean theorem;

FIG. 2 is a diagram similar to that of FIG. 1 but showing the geometric relationships graphically illustrated by the apparatus embodying the present invention for an angle of 15°;

FIG. 3 is a diagram comparable to that of FIG. 2 but for an angle of 45°;

Figure 4:
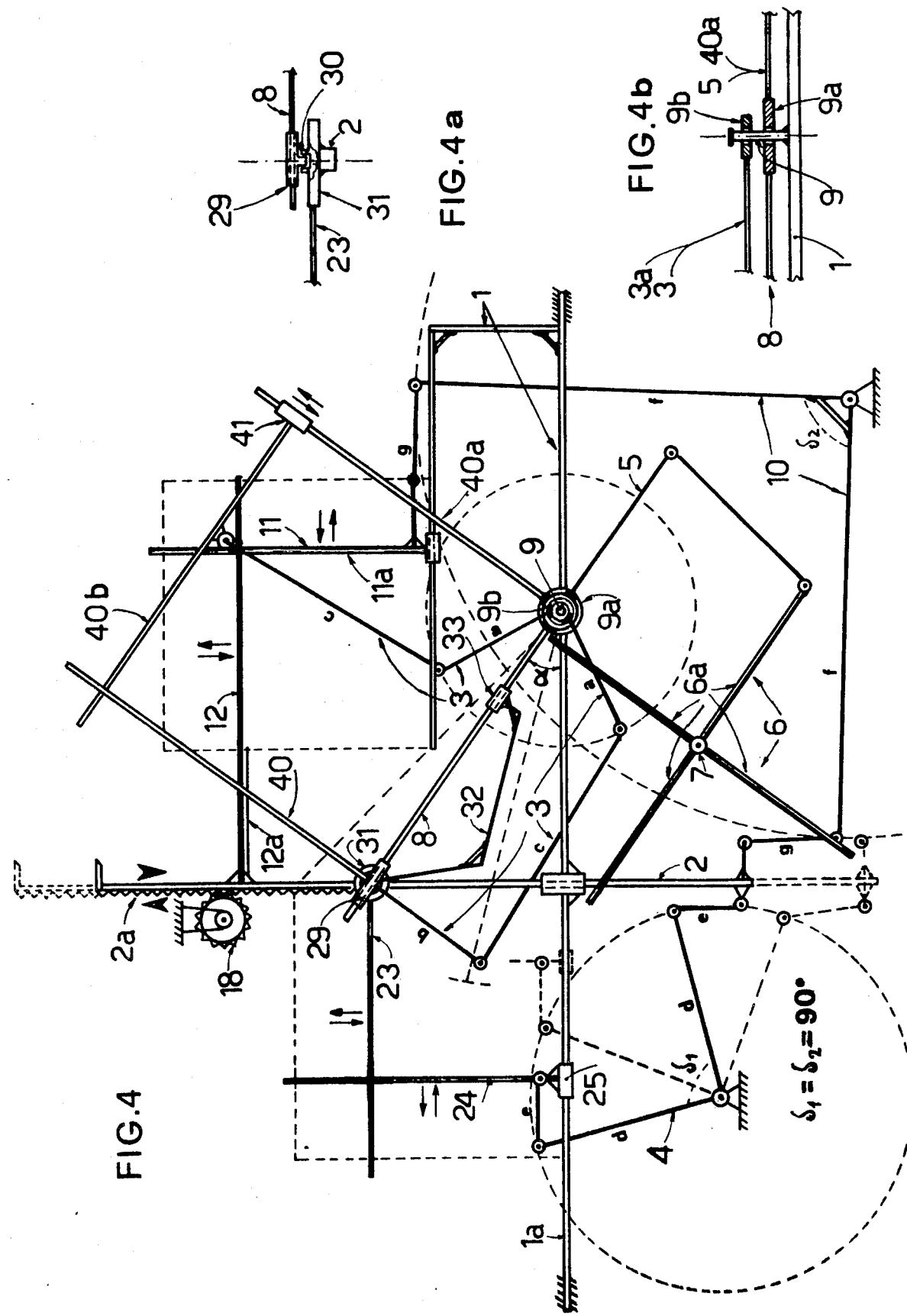
FIG. 4 is a front elevational view of the mechanical assembly of the apparatus.
Figure 5:
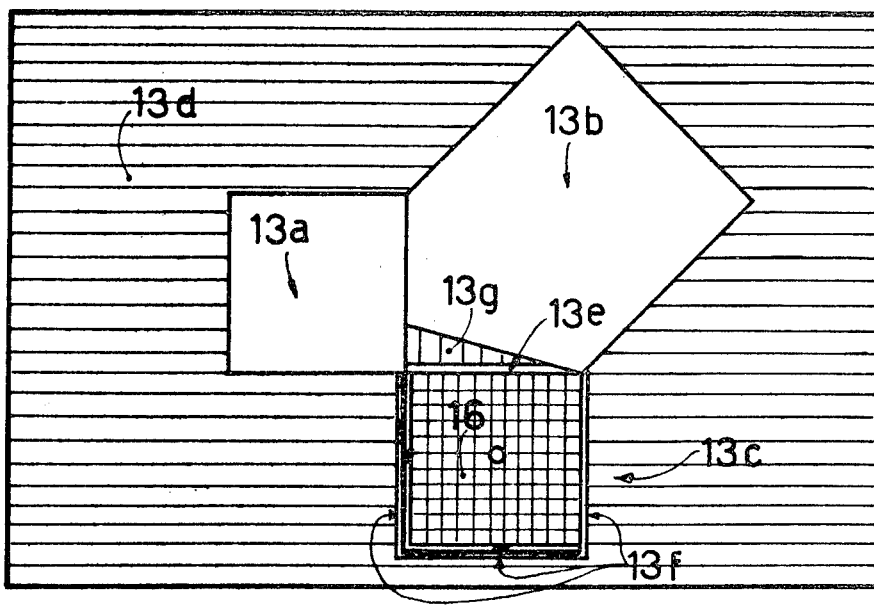
Figure 6:
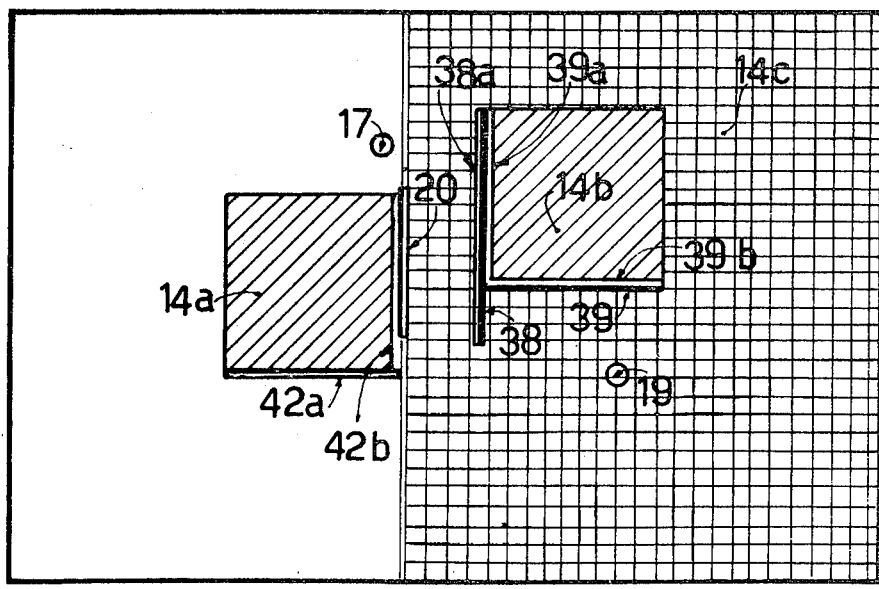
Figure 8:
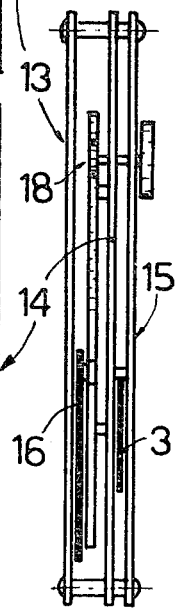
Figure 7:
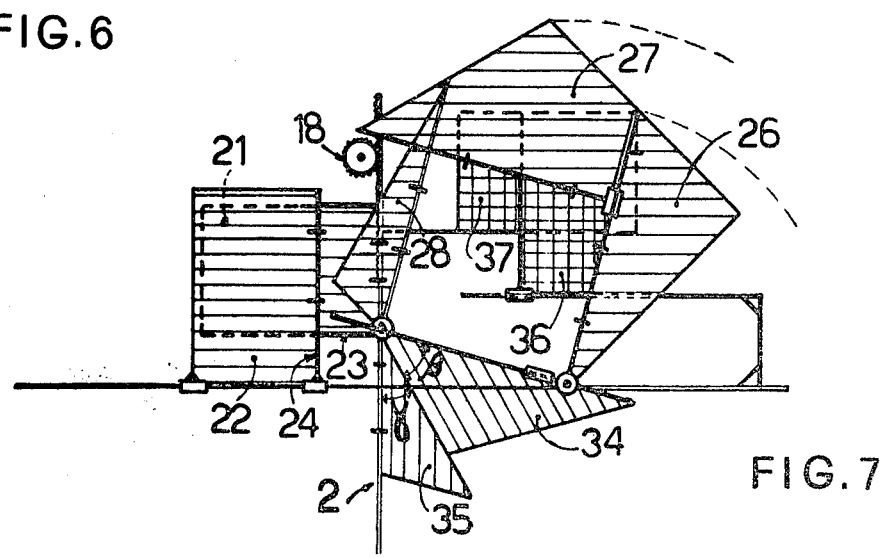

FIG. 4a an enlarged, fragmentarilly-illustrated side elevational view of a portion of the apparatus shown in FIG. 4;

FIG. 4b is an enlarged, fragmentarily-illustrated side elevational view of another portion of the apparatus shown in FIG. 4;

FIG. 5 is a front elevational view of a first board of the apparatus;

FIG. 6 is a front, elevational view of an intermediate board of the apparatus;

FIG. 7 is a view similar to that of FIG. 4 but with the lever systems removed and further showing panels secured to various legs of the apparatus; and FIG. 8 is a side, elevational view of the apparatus fully assembled.

Referring now to the drawings, the apparatus embodying the present invention uses a well-known method attributed to Henry Perigal, which consists of subdividing into polygons the squares $Q_1$ and $Q_2$, respectively built on the hypotenuse, and on the perpendicular which forms with the hypotenuse, an angle $\alpha$, which may vary between fairly wide limits and in such a manner that the length of this perpendicular is constant, and only the length of the other perpendicular can vary.

In this method, the square $Q_1$ built on the hypotenuse of the right triangle $T_o$ is subdivided into five polygons by means of two vertical segments KS and MV, and two horizontal segments NU and LR, the first ones respectively starting from the mean points K and M of the lower and upper sides, and the second ones respectively starting from the mean points N and L of the other two sides of the square. The square $Q_2$ is subdivided into four polygons by means of two straight-lined segments at right angles and integral with themselves, EF and GH, crossing each other at the center D of the square $Q_2$.

As can easily be demonstrated, when varying the angle $\alpha$ formed by the hypotenuse BC with the perpendicular AB, while the segments EF and GH (fixed in perpendicular relationship to one another are rotated around point D, so as to maintain themselves parallel and perpendicular, respectively, to the hypotenus BC, the polygons $P_1^I$, $P_1^{II}$, $P_1^{III}$, and $P_1^{IV}$ will remain equal to one another and equal to the polygons $P_1^I$, $P_1^{II}$, $P_1^{III}$ and $P_1^{IV}$, and squares $P_1$ and $Q_3$ will also remain equal to each other.

The apparatus is designed in such a manner that by reading suitable graduations on some edges of these polygons, a direct and immediate verification of the aforementioned equality relations can be performed.

As seen in FIG. 4, the apparatus basically consists of a fixed frame 1; a vertically-movable frame 2; levers 3 to automatically change the position of the leg 40b delimiting the square built on the hypotenuse (the legs a and b are of equal length, as are the legs c — the legs a moreover form between them an angle of 90°—); a lever system 4 to move a side (leg 24) of the square $Q_3$ (the legs d, like the legs c, are of equal length between themselves); a lever 5 to tie the rotations of the cross 6 (EF and GH of FIG. 1) around the pin 7, to the rotations of the leg 8 representing the hypotenuse, around pin 9 (FIG. 4b), so that one of the legs 6 (EF of FIG. 1) is constantly kept parallel to leg 8 (FIG. 4); a lever system 10 to move leg 11 (MV of FIG. 1) in parallel to itself, from where to constantly obtain the equality between $P_1$ and the square $Q_3$ (the legs f are equal to each other, and the legs g are equal to each other).

In the preferred embodiment of the apparatus, angle $\alpha$ formed by the hypotenuse with the horizontal perpendicular may vary between 15° and 45° (FIGS. 2 and 3).

The novelty of its mechanical structure mainly results from the observation that the position of the segments KS and LR (FIG. 1)(or 38 and 39 of FIG. 6) does not change when changing the dimensions of the square $Q_1$ and thus of the angle formed by the hypotenuse BC with the perpendicular AB.

This allows subdivision of square $Q_1$ into five polygons, without requiring complicated steps to perform this subdivision, solely by using the horizontal leg 12 (FIG. 4) which is integral with movable frame 2, and vertical leg 11 operated by lever 10. Another important and novel characteristic of the apparatus is the system used to bring about the movement of the panels necessary to mask the mechanical structure and obtain the identity of colors of the corresponding geometrical figures. To this effect, the mechanical part of the apparatus illustrated in FIG. 4 is mounted between three superimposable small boards or tablets, respectively 13, 14 and 15 (FIGS. 5, 6 and 8).

Tablet 13 (FIG. 5) is provided with a window 13a having the dimensions of the largest square which can be built on the vertical perpendicular AC of the right triangle $T_o$, with a window 13b having the total area of the largest square $Q_1$ (FIG. 3) which can be built on the hypotenuse and of the section of the right triangle $T_o$ comprised between the values 15° and 45° of the angle $\alpha$, with a window 13c (FIG. 5) having the dimensions of the square built on the horizontal perpendicular AB (FIG. 1) occluded by a panel 16 of the same dimensions, spaced so as to create a reciprocal interspace in which to move the extremities of the legs forming the cross 6 (FIG. 4) when the cross itself turns around pin 7, so as to make visible only the parts superimposed on panel 16.

Intermediate tablet 14 (FIG. 6), besides serving as the base for the mounting of the mechanical parts of the apparatus, is provided with hole 17 for the passage of the driving shaft of toothed wheel 18 (FIG. 4), designed to provoke the movements of mobile frame 2 acting on rack 2a of hole 19 and of groove 20 (FIG. 6), to allow the mounting of lever 3 (FIG. 4) in the rear portion of tablet 14 (FIG. 6).

Tablet 14 is colored as follows: in area 14a directly subjected to window 13a (FIG. 5), of which it has the same square area, the color is the same as area 14b (FIG. 6) which represents larger square $P_1$ (FIG. 3), which can be in the center of square $Q_1$ with the subdivision into polygons, when the hypotenuse forms with the horizontal perpendicular the maximum angle allowed by the apparatus, i.e., when $\alpha$ is equal to 45°. Part 14c (FIG. 6) instead is colored as panel 16 (FIG. 5) occluding window 13c.

The task of tablet 15 (FIG. 8) is to protect and conceal those parts of the mechanism which project from the rear portion of tablet 14 and actually turn the apparatus into a device with a closed housing.

Movable panels (FIG. 7), which serve to delimit and color, beneath windows 13a and 13b (FIG. 5), the other geometrical figures formed by the apparatus, are connected to the movable legs of the mechanical device (FIG. 7).

Panel 21, integral with frame 2 (FIG. 4) and leg 23, and panel 22 (FIG. 7), integral with leg 24, operated by lever 4 (FIG. 4) so as to slide on the rail of frame 1 by means of sliding carriage 25, are both of the same color as bottom 13d of tablet 13, and have the dimensions strictly necessary and sufficient to delimit square $Q_3$ (FIG. 1).

Panels 26, 27 and 28 (FIG. 7), which are also of the same color as bottom 13d (FIG. 5), and panels 21 and 22 (FIG. 7), are designed to delimit the square built on the hypotenuse in the area of window 13b (FIG. 5); they respectively have the form of a right triangle, a quadrangle and an obtuse triangle, all three with the length of their longest side being equal to that of the hypotenuse when the latter forms with the horizontal perpendicular an angle a of 45°.

To sliding guide 29 (FIG. 4) of leg 8 which is integral with pin 30 mounted on base 31 which, in turn, is integral with movable frame 2, is rigidly connected to one extremity of small frame 32 which, with its other extremity, can slide on leg 8 by means of coupling sleeve 33.

This small frame serves as support to a panel of triangular shape 34 (FIG. 7) having an angle $\beta = 45°$, and such form and dimensions as to completely cover the sector of the right triangle $T_o$ comprised between 15° and 45° of angle $\alpha$ (FIGS. 2 and 3), so that in cooperation with panel 35, integral with frame 2 (FIG. 4), which is also triangular with angle $\gamma = 30°$ (FIG. 7), window 13b (FIG. 5) can continually be occluded in the portion corresponding to the sector of right triangle $T_o$ comprised between 15° and 45° of angle $\alpha$ (FIGS. 2 and 3).

Panels 34 and 35 (FIG. 7) and triangle 13g (FIG. 5) of tablet 13 are of the same color.

Right panels 36 and 37 (FIG. 7), respectively, connected to the movable legs 11 and 12 (FIG. 4) are of the same color as bottom 14c (FIG. 6) of tablet 14 and of panel 16 (FIG. 5); they serve to delimit the central square $P_1$ (FIG. 1) and subdivide the portion surrounding the square into four polygons, panel 36 (FIG. 7) being superimposed to panel 37, so that polygons $P_1^I$, $P_1^{II}$, $P_1^{III}$ and $P_1^{IV}$ (FIG. 1) remain delimited by lines 38 and 39 (FIG. 6) and by the suitably colored legs 11 and 12 (FIG. 4).

Leg 40 is integral with guide 29 of leg 8 and with lever 3b; leg 40a and leg 8 are also integral between themselves.

The sliding of leg 40b occurs perpendicularly to leg 40a by means of sliding guide 41.

Edges 42a, 42b, 38a, 39a and 39b of FIG. 6; 13e and 13f of FIG. 5, as well as 6a, 11a and 12a of FIG. 4, are graduated in millimeters to allow the immediate measurement of the sides of the geometrical figures and thus to verify their equality.

Straight line 38 (FIG. 6) extends to below square 14b until it meets with the hypotenuse (FIG. 5) of panel 13g representing right triangle $T_o$ for $\alpha = 15°$; this line serves to delimit polygons $P_1^I$ and $P_1^{IV}$ (FIG. 1).

Squares 14a and 14b (FIG. 6) of tablet 14 occupy such positions as to be exactly subjected to windows 13a and 13b (FIG. 5) of tablet 13, when tablets 13 and 14 are exactly superimposed.

In a further embodiment, for the purpose of generalizing the use of the apparatus, thus reducing the production costs to a minimum, its operation may be filmed and reproduced on slides or other visual aids, with or without sound, so that by projecting them on a screen, the same didactic effect is obtained as with the direct use of the apparatus.

Logically, acute angle $\alpha$ can also assume values below 15°. In another embodiment, the apparatus can be used in a manner that the hypotenuse and thus the square built on it, has fixed dimensions, whereas the perpendiculars will change with the relative squares.

While only a single embodiment of the present invention has been shown and described, it will be obvious to those persons of ordinary skill in the art, that many changes and modifications may be made thereunto, without departing from the spirit and scope of the invention.

What is claimed is:

1. An apparatus for the comprehensive verification of the Pythagorean theorem by subdividing into five polygons the square built on the hypotenuse, with one of the polygons being a central square having an axis coaxial with the axis of the square built on the hypotenuse, and into four polygons the square built on the longer perpendicular side, of a right triangle, comprising:

a generally horizontally-disposed, fixed frame;

a vertically-slidable, generally vertically-disposed movable frame supported on said fixed frame, said movable frame having a vertically-disposed, toothed rack mounted thereon and a sleeve supported by a pin for rotation about an axis normal to said movable frame and fixed frame;

a toothed wheel in mesh with the teeth of said rack and operable by a knob to effect vertical movement of said movable frame;

a leg representing the hypotenuse of a right triangle, said leg having one end non-slidably- and rotatably-supported on said fixed frame, and its other end being slidably received in said sleeve, with the portion of said movable frame disposed between said sleeve and said fixed frame defining one perpendicular side of said right triangle and the portion of said fixed frame between said one end of said leg and said movable frame defining the other perpendicular side of said right triangle;

a system of three legs disposed in a U-shaped arrangement with adjacent legs at right angles to one another, said system having coupled to said leg representing said hypotenuse to define a square built on said hypotenuse, one of said legs representing the upper side of said square and the other two legs representing the left and right lateral sides of said square, respectively, with said leg representing said hypotenuse serving as the lower side of said square, at least one of said legs of said system being reciprocably movable relative to said other legs so as to vary the dimensions of said square when changing the effective length of said leg representing said hypotenuse effected by movement of said movable frame, which changes the included angle between said leg representing the hypotenuse and said fixed frame;

lever means for moving said at least one leg of said system, said lever means being responsive to movement of said leg representing said hypotenuse;

a vertically-disposed leg representing the west side of a square built on the shorter perpendicular side of the right triangle, supported for sliding movement on said fixed frame;

lever means for moving said leg representing the west side toward and away from said movable frame in response to movement of said movable frame relative to said fixed frame;

a horizontally-disposed leg representing a north side of a square built on the shorter perpendicular side of the right triangle, mounted on said movable frame for movement therewith, the other two east and south sides of the square built on the shorter, perpendicular side of the right triangle being defined by rectilinear edge portions of said movable and fixed frames, respectively;

a cross including two intersecting legs disposed at right angles to one another, rotatable about an axis at the center of the square built on the longer perpendicular side of the right triangle;

lever means for positioning said cross at the center of the square built on said longer, perpendicular side and for rotating said cross in direct response to rotation of said leg representing said hypotenuse, so that one of said legs of said cross is kept perpendicular, and the other leg of said cross is kept parallel, relative to said leg representing said hypotenuse;

a vertically-disposed leg representing a straight line segment passing through the mean point of the upper side of the square built on the hypotenuse, which leg is slidably supported on said fixed frame;

lever means for moving said vertically-disposed leg representing said straight line segment;

a horizontally-disposed leg representing a straight line segment passing through the mean point of the left side of the square built on the hypotenuse, which is rigidly mounted on said movable frame;

a plurality of polygonal panels in different colors relative to each of the geometrical figures obtained through the subdivision of the squares built on the sides of the right triangle, each of said panels being coupled to and movable with one of said legs;

a first board disposed parallel to, and behind of, said movable and fixed frames, said board being subdivided into various colored sectors which, in cooperation with said colored panels, define identical geometrical figures by the same color;

a second board, disposed parallel to, and in front of said movable and fixed frames, said board including a plurality of window openings, exactly delimiting in dimensions and position the squares built upon the sides of a right triangle having a maximum included angle of 45° formed by said leg representing said hypotenuse and said fixed frame portion representing said longer perpendicular side of said right triangle, the window opening positioned and dimensioned relative to the square built on said longer perpendicular side being at least partly occluded by a square panel of the same dimensions spaced behind and parallel to said second board, a sufficient distance to permit the legs of said cross to pass therebetween, said board also having a right triangular sector formed thereon, which is positioned and dimensioned to correspond to the dimensions of a right triangle having a minimum included angle of less than 45°; and a third board, disposed parallel to and in back of said first board, which serves as a cover, said boards being spaced from one another in superimposed relation.

2. The apparatus according to claim 1, wherein said first board has two lines formed thereon which respectively define the west and south sides of said central square and each of which has a length at least equal to the maximum length which the sides of this central square can assume when said included angle is 45°, said line representing said west side extending below said line representing said south side, until it meets the hypotenuse of said triangular sector formed on said second board, wherein said horizontally-disposed leg and said vertically-disposed leg representing said straight-line segments define, respectively, the north and east sides of said central square of maximum dimensions, to said movable frame, said vertically-disposed leg having a length equal to the maximum length of the side of said central square for a right triangle having said maximum-included angle of 45°, and wherein said lever means for moving said vertically-disposed leg representing said line segment is actuated by movement of said movable frame, so that the displacement of said vertically-and-horizontally-disposed legs representing said line segments is simultaneous and equal and so as to cause the dimensions of said central square to vary with continuity and keep it constantly equal to the square built on the shorter perpendicular side of said right triangle.

3. The apparatus according to claim 2, wherein the surface of said second tablet has a uniform color except for said triangular sector which is colored differently, said color of said surface being the same as the color of the polygonal panels coupled to said legs of said system of legs, which are intended to delimit the left, right and upper side of said square built on the hypotenuse of said right triangle and the polygonal panels mounted on the vertically-disposed and horizontally-disposed legs representing said west and north sides of said square built on said shorter perpendicular side of said right triangle; wherein the polygonal panel coupled to said leg representing said hypotenus is triangular; wherein said movable frame has a triangular panel coupled thereto and wherein said triangular panels coupled to said movable frame and said leg representing said hypotenuse are the same color as said triangular sector; and wherein the polygonal panels coupled to said legs representing said line segments and, in turn, the sides of said central square are the same color as said panel occluding said window opening corresponding to the square built on said longer perpendicular side of said right triangle.

4. The apparatus according to claim 1, wherein said first board has two square sectors of the same color formed thereon, which are positioned relative to said first board such that square built on said shorter perpendicular side and said central square, viewable through the windows of said second board are represented by one of said same colored square sectors, the remainder of said first board being of a different color, which is the same as said panel occluding said window of said second board, which represents the square built on the longer perpendicular side of said right triangle.

5. The apparatus according to claim 1, wherein the sides of the square panel on said second board representing said square built on said longer perpendicular side of said triangle, the south and east sides of the square sector on said first board representing the square built on said shorter side of said right triangle, said legs representing said line segments, and said legs of said cross, are each provided with a graduated edge in millimeters, to enable an immediate reading of the dimensions of the geometrical figures formed by the apparatus.

6. The apparatus according to claim 1, wherein the panels coupled to said system of legs comprise two triangular panels, each of which is coupled to one of the legs representing the left and right sides of the square built on the hypotenuse and a quadrangular panel coupled to the other leg of said system representing the upper side of said square built on the hypotenuse, each of said panels coupled to said system of legs having a longest side which is equal in length to the maximum length assumed by the effective length of the leg representing said hypotenuse, when it assumes a maximum included angle of 45° with the longer perpendicular side of the triangle.

7. The apparatus according to claim 1, wherein the included angle has a minimum value below 15°.

8. The apparatus according to claim 1, wherein the said boards and panels are appropriately colored, so that identical geometrical figures formed by said apparatus are the same color.

* * * * *